United States Patent
Xu et al.

(10) Patent No.: US 9,092,156 B1
(45) Date of Patent: Jul. 28, 2015

(54) METHODS AND APPARATUS FOR MANAGING STORAGE DEVICE COMMANDS

(71) Applicant: Marvell International Ltd., Hamilton (BM)

(72) Inventors: Wei Xu, Milpitas, CA (US); Fei Sun, Irvine, CA (US); Jinjin He, San Jose, CA (US); Bo Fu, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/280,832

(22) Filed: May 19, 2014

Related U.S. Application Data (60) Provisional application No. 61/828,844, filed on May 30, 2013.

(51) Int. Cl.
| | |
|---|---|
| *G06F 13/00* | (2006.01) |
| *G06F 3/06* | (2006.01) |
| *G06F 13/16* | (2006.01) |
| *G06F 13/18* | (2006.01) |

(52) U.S. Cl.
CPC ............. *G06F 3/0659* (2013.01); *G06F 3/061* (2013.01); *G06F 3/0673* (2013.01); *G06F 3/0679* (2013.01); *G06F 3/0688* (2013.01); *G06F 13/1605* (2013.01); *G06F 13/1642* (2013.01); *G06F 13/18* (2013.01); *G06F 2003/0691* (2013.01)

(58) Field of Classification Search
None
See application file for complete search history.

(56) References Cited

U.S. PATENT DOCUMENTS

| | | | | |
|---|---|---|---|---|
| 5,276,838 | A * | 1/1994 | Rao et al. ...................... | 711/117 |
| 6,170,042 | B1 * | 1/2001 | Gaertner et al. .............. | 711/158 |
| 6,182,177 | B1 * | 1/2001 | Harriman ...................... | 710/112 |
| 6,223,243 | B1 * | 4/2001 | Ueda et al. .................... | 710/244 |
| 6,523,098 | B1 * | 2/2003 | Anderson ..................... | 711/158 |
| 6,526,484 | B1 * | 2/2003 | Stacovsky et al. ............ | 711/158 |
| 6,564,304 | B1 * | 5/2003 | Van Hook et al. ............ | 711/154 |
| 6,738,840 | B1 * | 5/2004 | Nouvet et al. ................... | 710/52 |
| 6,826,630 | B2 * | 11/2004 | Olds et al. ......................... | 710/6 |
| 6,865,635 | B1 * | 3/2005 | Nouvet et al. ................. | 710/244 |
| 7,010,654 | B2 * | 3/2006 | Blackmon et al. ............ | 711/158 |
| 7,366,800 | B2 * | 4/2008 | Flynn, Jr. ........................ | 710/40 |
| 7,552,252 | B2 * | 6/2009 | Shelor ............................. | 710/52 |
| 7,979,603 | B2 * | 7/2011 | Yamaguchi et al. ............ | 710/40 |
| 7,996,599 | B2 * | 8/2011 | Cornwell et al. ............. | 711/103 |

(Continued)

OTHER PUBLICATIONS

'Memory Access Scheduling' by Scott Rixner et al., copyright 2000 ACM.*

*Primary Examiner* — Steven Snyder (57) ABSTRACT

Systems and methods for managing storage device commands are provided. A first storage device command is received. A first priority associated with the first storage device command is identified. A plurality of storage device commands that was received before the first storage device command is identified. Each of the plurality of storage device commands is stored in a buffer and organized in a sequence. A determination is made as to whether the first priority associated with the first storage device command is greater than a second priority associated with a second storage device command of the plurality of storage device commands. The first storage device command is added to the buffer at a first position in the sequence that is earlier than a second position of the second storage device command in response to determining the first priority is greater than the second priority.

20 Claims, 5 Drawing Sheets

(56) References Cited

U.S. PATENT DOCUMENTS

| | | | |
|---|---|---|---|
| 8,239,589 B1* | 8/2012 | Certain et al. | 710/39 |
| 2001/0028524 A1* | 10/2001 | Hoskins | 360/55 |
| 2005/0097265 A1* | 5/2005 | Shrader et al. | 711/105 |
| 2005/0166014 A1* | 7/2005 | Kobayashi et al. | 711/112 |
| 2008/0104283 A1* | 5/2008 | Shin et al. | 710/6 |
| 2010/0082856 A1* | 4/2010 | Kimoto et al. | 710/45 |
| 2010/0082879 A1* | 4/2010 | McKean et al. | 711/103 |
| 2012/0159052 A1* | 6/2012 | Lee et al. | 711/103 |

\* cited by examiner

METHODS AND APPARATUS FOR MANAGING STORAGE DEVICE COMMANDS

CROSS REFERENCE TO RELATED APPLICATION

This disclosure claims the benefit of U.S. Provisional Application No. 61/828,844, filed May 30, 2013, which is incorporated herein by reference in its entirety.

FIELD OF USE

The present disclosure relates generally to storage device systems and methods and, more particularly, to managing solid state storage device commands.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, is neither expressly nor impliedly admitted as prior art against the present disclosure.

Commands to write/read data to/from solid state storage devices (e.g., NAND flash storage devices) are typically handled in the same order as they are received. Typically, separate command queues are in place to store high priority commands. These separate queues enable high priority commands to be assigned to a memory command line before other commands are assigned. However, there is no mechanism in place to prioritize the high priority commands over other commands that are pending in the memory command line.

SUMMARY

Systems and methods for managing storage device commands are provided. In some embodiments, a first storage device command is received. A first priority associated with the first storage device command may be identified. A plurality of storage device commands that was received before the first storage device command may be identified. Each of the plurality of storage device commands is stored in a buffer and organized in a sequence. A determination may be made as to whether the first priority associated with the first storage device command is greater than a second priority associated with a second storage device command of the plurality of storage device commands. The first storage device command may be added to the buffer at a first position in the sequence that is earlier than a second position of the second storage device command in response to determining the first priority is greater than the second priority.

In some implementations, the priority of each storage device command is received from a host device external to the storage device. In some embodiments, the storage device commands are retrieved from the buffer according to the sequence to operate on a storage device.

In some embodiments, before adding the first storage device command to the buffer, a determination is made as to whether adding the first storage device command at the first position in the sequence conflicts with a third of the storage device commands in the buffer that is in a third position that is later than the first position in the sequence. In some implementations, the first storage device command is added to the buffer at a fourth position that is later than the third position in the sequence in response to determining that adding the first storage device command at the first position conflicts with the third storage device command. In some implementations, the addition of the first storage device command to the buffer at the first position is performed in response to determining that adding the first storage device command at the first position does not conflict with the third storage device command.

In some embodiments, the buffer is a first buffer. A determination is made as to whether the first priority associated with the first storage device command is greater than a priority associated with any of the storage device commands in the first buffer. In response to determining that the first priority is not greater than the priority associated with any of the storage device commands in the first buffer, a determination is made as to whether the first priority associated with the first storage device command is greater than a third priority associated with a third storage device command in a second buffer.

In some embodiments, a system for managing storage device commands includes a buffer and control circuitry. The control circuitry is configured to receive a first storage device command. The control circuitry is configured to identify a first priority associated with the first storage device command. The control circuitry is configured to identify a plurality of storage device commands that was received before the first storage device command, wherein each of the plurality of storage device commands is stored in the buffer and organized in a sequence. The control circuitry is configured to determine whether the first priority associated with the first storage device command is greater than a second priority associated with a second storage device command of the plurality of storage device commands. The control circuitry is configured to add the first storage device command to the buffer at a first position in the sequence that is earlier than a second position of the second storage device command in response to determining the first priority is greater than the second priority.

In some implementations, the priority of each storage device command is received from a host device external to the storage device. In some embodiments, the control circuitry is configured to retrieve the storage device commands from the buffer according to the sequence to operate on a storage device.

In some embodiments, the control circuitry is configured to before adding the first storage device command to the buffer, determine whether adding the first storage device command at the first position in the sequence conflicts with a third of the storage device commands in the buffer that is in a third position that is later than the first position in the sequence. In some implementations, the control circuitry is configured to add the first storage device command to the buffer at a fourth position that is later than the third position in the sequence in response to determining that adding the first storage device command at the first position conflicts with the third storage device command. In some implementations, the control circuitry is configured to perform the adding the first storage device command to the buffer at the first position in response to determining that adding the first storage device command at the first position does not conflict with the third storage device command.

In some embodiments, the buffer is a first buffer. The control circuitry is configured to determine whether the first priority associated with the first storage device command is greater than a priority associated with any of the storage device commands in the first buffer. In response to determining that the first priority is not greater than the priority associated with any of the storage device commands in the first buffer, the control circuitry is configured to determine whether the first priority associated with the first storage device command is greater than a third priority associated with a third storage device command in a second buffer.

In some implementations, the control circuitry is configured to move storage device commands stored in the buffer to one of a plurality of command line buffers in an order determined by the sequence. Each of the command line buffers outputs to a corresponding one of a plurality of storage devices.

BRIEF DESCRIPTION OF THE DRAWINGS

The details of one or more implementations are set forth in the accompanying drawings and the description below. Other features and various advantages will be more apparent upon consideration of the following detailed description, taken in conjunction with the accompanying drawings in which.

DETAILED DESCRIPTION

This disclosure generally relates to managing storage device commands. For illustrative purposes, this disclosure is described in the context of a solid state storage device (e.g., a flash storage device or a NAND-based storage device). It should be understood, however, that this disclosure is applicable to any other type of non-volatile storage device (e.g., magnetic storage device, ROM, PROM, EPROM, EEPROM, nvSRAM, FeRAM, MRAM, PRAM, CBRAM, SONOS, RRAM, NRAM, Millipede memory, or holographic storage device).

Figure 1:
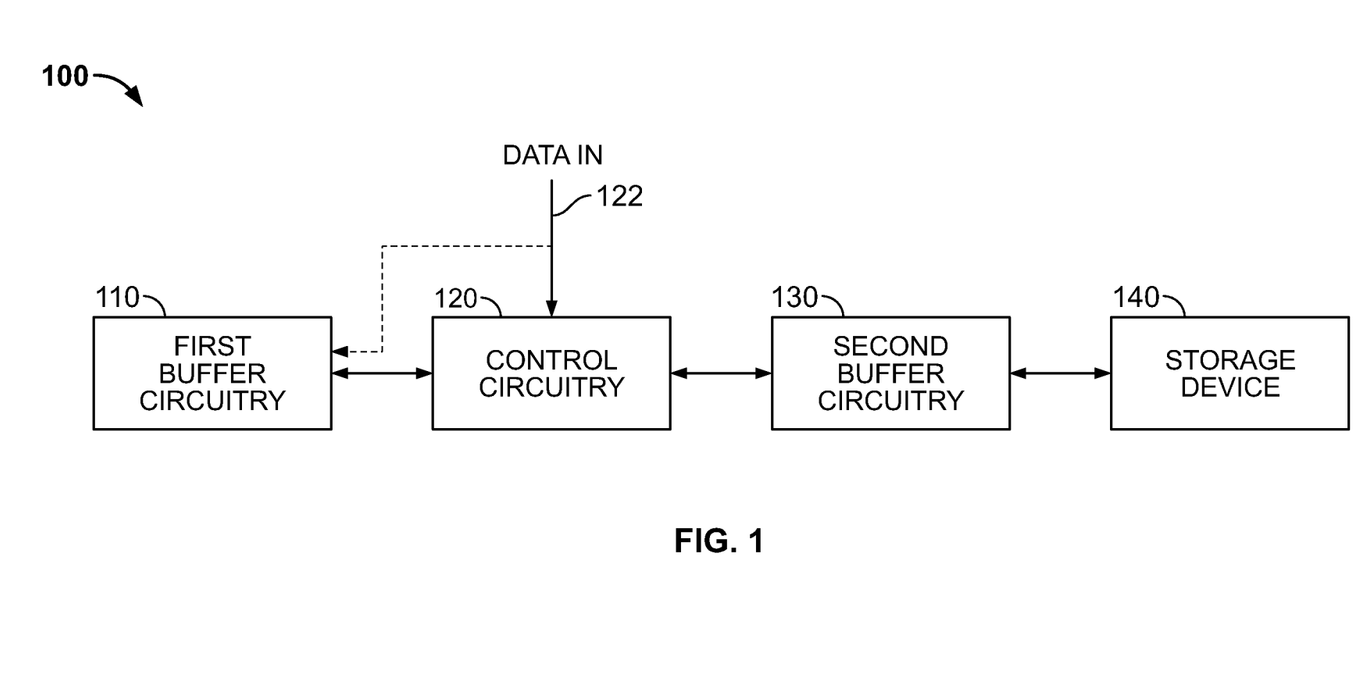
FIG. 1 is a diagram of an illustrative storage device system in accordance with an embodiment of the present disclosure.

FIG. 1 is a diagram of an illustrative storage device system 100 in accordance with an embodiment of the present disclosure. System 100 includes first buffer circuitry 110, control circuitry 120, second buffer circuitry 130, and a solid state storage device 140. As illustrated, input data 122 is received by control circuitry 120. In some implementations, input data 122 may be received by first buffer circuitry 110 and/or control circuitry 120 (as shown by the dotted lines).

In some embodiments, control circuitry 120 may receive data 122 from another system component (not shown). For example, data 122 may be provided by an application, firmware (FW) or another storage device (e.g., DRAM). Data 122 may be referred to as a command and may include a user data portion, an address portion and/or an operation (e.g., control portion) indicating a read or write request (e.g., indicating whether to read or write the user data portion to the address portion). Data 122 may also include a priority portion indicating whether the data is normal or high priority.

In some embodiments, control circuitry 120 may first store received data 122 in first buffer circuitry 110. First buffer circuitry 110 may include one or more command queues. Each command queue may organize data into a sequence such that data is output in the order in which the data was received. Although this disclosure is discussed in the context of first buffer circuitry 110, including one or more queues, any other type of temporary storage arrangement may be provided. For example, first buffer circuitry 110 may include one or more stacks and/or a combination of stacks and queues. In some implementations, as discussed in connection with FIG. 2, control circuitry 120 may determine a priority associated with received data 122 before storing data 122 in first buffer circuitry 110. In response to determining that the priority exceeds a threshold (e.g., the data is associated with a high priority), control circuitry 120 may bypass other commands stored in first buffer circuitry 110 to store the received data ahead of other commands that were previously stored in first buffer circuitry 110.

In some embodiments, control circuitry 120 may determine a need to move or transfer commands stored in first buffer circuitry 110 to second buffer circuitry 130. The need may correspond to second buffer circuitry 130 having one or more empty slots or second buffer circuitry 130 having enough space to fit additional commands. In response to determining a need to move or transfer the commands, control circuitry 120 may retrieve one or more commands from first buffer circuitry 110 and may store the retrieved commands to second buffer circuitry 130. The commands may be retrieved from first buffer circuitry 110 according to the sequence in which they are arranged. For example, the commands may be retrieved from first buffer circuitry 110 in the order in which they were stored or in the order defined by the one or more command queues.

In some implementations, control circuitry 120 may retrieve commands stored in a first (or leading) position in first buffer circuitry 110 before retrieving commands stored in second (or later) positions. In some implementations, first buffer circuitry 110 may include a high priority queue. In such circumstances, control circuitry 120 may retrieve commands from the high priority queue before retrieving commands stored in other queues of first buffer circuitry 110.

Second buffer circuitry 130 may include one or more command lines. Each command line may be a queue or a stack. Each command line may organize data into a sequence such that data is output in the order in which the data was received. Although this disclosure is discussed in the context of second buffer circuitry 130, including one or more queues, any other type of temporary storage arrangement may be provided. For example, second buffer circuitry 130 may include one or more stacks and/or a combination of stacks and queues.

Second buffer circuitry 130 is coupled to storage device 140. Second buffer circuitry 130 may operate on storage device 140 according to the commands stored in second buffer circuitry 130. The order in which second buffer circuitry 130 operates on storage device 140 may be determined based on the sequence in which data is organized in second buffer circuitry 130. For example, when the data is organized in a queue sequence or arrangement, second buffer circuitry 130 may operate on storage device 140 in the same order as the data is stored to second buffer circuitry 130. In particular, commands stored in a first (or leading) position in second buffer circuitry 130 may be performed before commands stored in second (or later) positions.

In some implementations, second buffer circuitry 130 may include multiple command lines and storage device 140 may include multiple memory devices. In such circumstances, each command line is coupled to a respective one of the memory devices of storage device 140. Specifically, commands stored in a first command line may be performed using a first memory device of storage device 140 according to the sequence in which the commands are stored in the first command line. Similarly, commands stored in a second command line may be performed using a second memory device of storage device 140 according to the sequence in which the commands are stored in the second command line. In such circumstances, control circuitry 120 may transfer, move or assign commands retrieved from first buffer circuitry 110 to one of the command lines in second buffer circuitry 130 based on availability of the command lines. In particular, control circuitry 120 may determine how many commands are stored in each command line in second buffer circuitry 130. Control circuitry 120 may select the command line with the least number of commands stored and may transfer, move or assign commands retrieved from first buffer circuitry 110 to the selected command line.

In some implementations, as discussed in connection with FIG. 3, control circuitry 120 may determine a priority associated with the command retrieved from first buffer circuitry 110. In response to determining that the priority exceeds a threshold (e.g., the data/command is associated with a high priority), control circuitry 120 may bypass other commands stored in second buffer circuitry 130 to store the retrieved command ahead of other commands that were previously stored in second buffer circuitry 130. Accordingly, a high priority command that is retrieved from first buffer circuitry 110 after another command that is already stored in second buffer circuitry 130 is nonetheless processed or performed before the other command that is already stored in second buffer circuitry 130.

Figure 2:
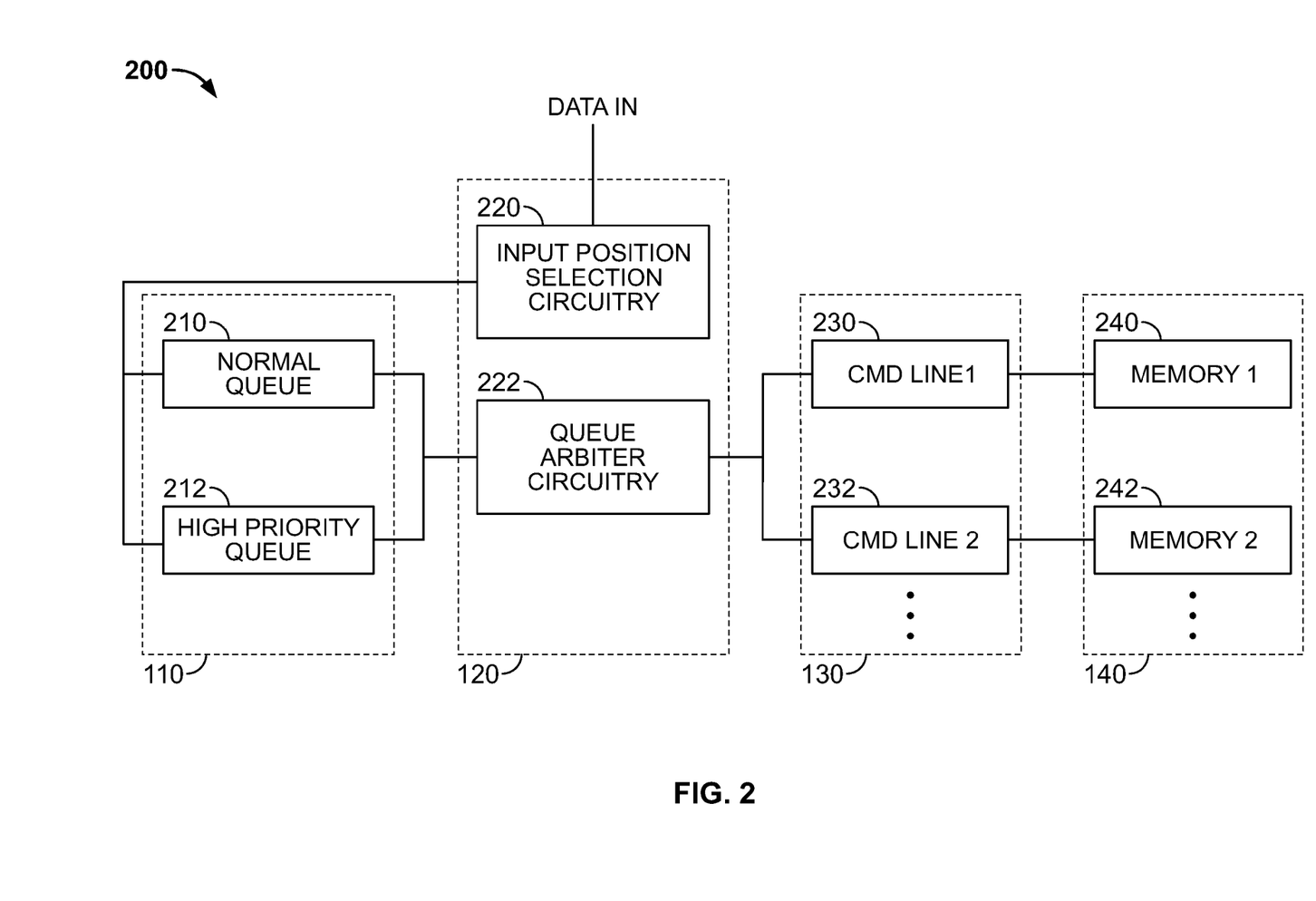
FIG. 2 is a diagram of an illustrative storage device commands management circuitry in accordance with an embodiment of the present disclosure.

FIG. 2 is a diagram of an illustrative storage device commands management circuitry 200 in accordance with an embodiment of the present disclosure. The components of circuitry 200 correspond to the components of system 100 and are similarly labeled. In some embodiments, control circuitry 120 may include input position selection circuitry 220 and first buffer circuitry 110 may include a normal queue 210 and a high priority queue 212. Data 122 may be received by input position selection circuitry 220. Input position selection circuitry 220 may process information in data 122 to determine whether the received command is associated with a high priority or normal priority.

In some embodiments, in response to determining that the received command is associated with a normal priority, position selection circuitry 220 may select normal queue 210 in which to store the command. For example, position selection circuitry 220 may select a position that is adjacent to and that follows the last stored command in normal queue 210 and may store the command in the selected position.

In some embodiments, in response to determining that the received command is associated with a high priority, position selection circuitry 220 may select high priority queue 212 in which to store the command. For example, position selection circuitry 220 may select a position that is adjacent to and that follows the last stored command in high priority queue 212 and may store the command in the selected position.

In some embodiments, in response to determining that the received command is associated with a high priority, position selection circuitry 220 may select normal queue 210 in which to store the command. In such circumstances, position selection circuitry 220 may select a position that bypasses other commands stored in normal queue 210 and may store the command in the selected position. For example, position selection circuitry 220 may select a position that is ahead of any other command that is stored in normal queue 210. In some implementations, in selecting the position, position selection circuitry 220 may determine whether bypassing other commands in normal queue 210 will conflict with the bypassed other commands. In particular, position selection circuitry 220 may cross-reference addresses of other commands stored in normal queue 210 to determine whether any of the addresses of other commands match the address of the received command. When none of the addresses of the other commands matches the address of the received command, position selection circuitry 220 may select the first position of normal queue 210 and store the received command in the first position ahead of all other commands stored in normal queue 210. In doing so, position selection circuitry 220 may increment the position of all the other commands stored in normal queue 210.

In some embodiments, in response to determining that an address of one of the other commands matches the address of the received command, position selection circuitry 220 may determine whether either of the commands in normal queue 210 with the matching address or the received command is a write command. In response to determining that the command is a write command, position selection circuitry 220 may select a position that is adjacent to and follows the command in normal queue 210 with the matching address. For example, normal queue 210 may include six commands (A-F) in respective positions 1-6. Position selection circuitry 220 may determine that command C, in position 3, has a matching address and is a write command as the received command. Accordingly, position selection circuitry 220 may select position 4 in which to insert the received command. In doing so, the positions of commands D-F are incremented and, as such, commands D-F are moved to positions 5-7 from positions 4-6 to accommodate the received command in position 5, which follows the conflicting command in position 4. Position selection circuitry 220 may process the remaining commands in normal queue 210 that are in positions that follow the selected position to determine that inserting the command in the selected position will not conflict with the other commands that are in later positions.

In some embodiments, in response to determining that the received command is associated with a high priority, position selection circuitry 220 may select a position in high priority queue 212 that bypasses other commands in high priority queue 212 in which to store the command. The process of selecting a position in high priority queue 212 that bypasses other positions may be similar to the process discussed above for bypassing other positions in normal queue 210.

Control circuitry 120 may include queue arbiter circuitry 222. Queue arbiter circuitry 222 may monitor second buffer circuitry 130 to determine whether space is available for additional commands in second buffer circuitry 130. In response to determining that second buffer circuitry 130 has space available for additional commands, queue arbiter circuitry 222 may retrieve a command from first buffer circuitry 110. For example, queue arbiter circuitry 222 may first determine whether high priority queue 212 has commands available. When high priority queue 212 has commands available, queue arbiter circuitry 222 may retrieve one or more commands starting with the command that is first in the queue from high priority queue 212. If high priority queue 212 does not have commands available, queue arbiter circuitry 222 may retrieve one or more commands starting with the command that is first in the queue from normal queue 210.

Queue arbiter circuitry 222 may transfer, move or assign the retrieved one or more commands to the available space in second buffer circuitry 130. For example, queue arbiter circuitry 222 may store the retrieved one or more commands starting with the last position that is available in second buffer circuitry 130. In some embodiments, second buffer circuitry 130 may include a first command line 230 and a second command line 232. Each command line 230 and 232 may be implemented as a queue. As such, each command line 230 and 232 may output data in the same order as the data was received. Each command line 230 and 232 may correspond to a given channel of storage device 140. For example, storage device 140 may include a first memory device 240 and a second memory device 242. First memory device 240 may correspond to a first channel of storage device 140 and second memory device 242 may correspond to a second channel of storage device 140. Commands are processed and performed on the corresponding channels of storage device 140 from the respective command line. In particular, commands stored in first command line 230 are performed in the sequence in which they are stored in first command line 230 on first memory device 240. Similarly, commands stored in second command line 232 are performed in the sequence in which they are stored in second command line 232 on second memory device 240. Any number of additional command lines and/or memory devices (or channels) may be included without departing from the scope of the disclosure.

Queue arbiter circuitry 222 may determine that first command line 230 has available space for one or more commands and in response may transfer, move or assign the retrieved one or more commands to the back or the end of first command line 230 (e.g., the last position in the queue). In some embodiments, queue arbiter circuitry 222 may determine which of first command line 230 and second command line 232 has fewer commands and may select the one with the fewest number of commands in which to transfer, move or assign the retrieved one or more commands.

Figure 3:
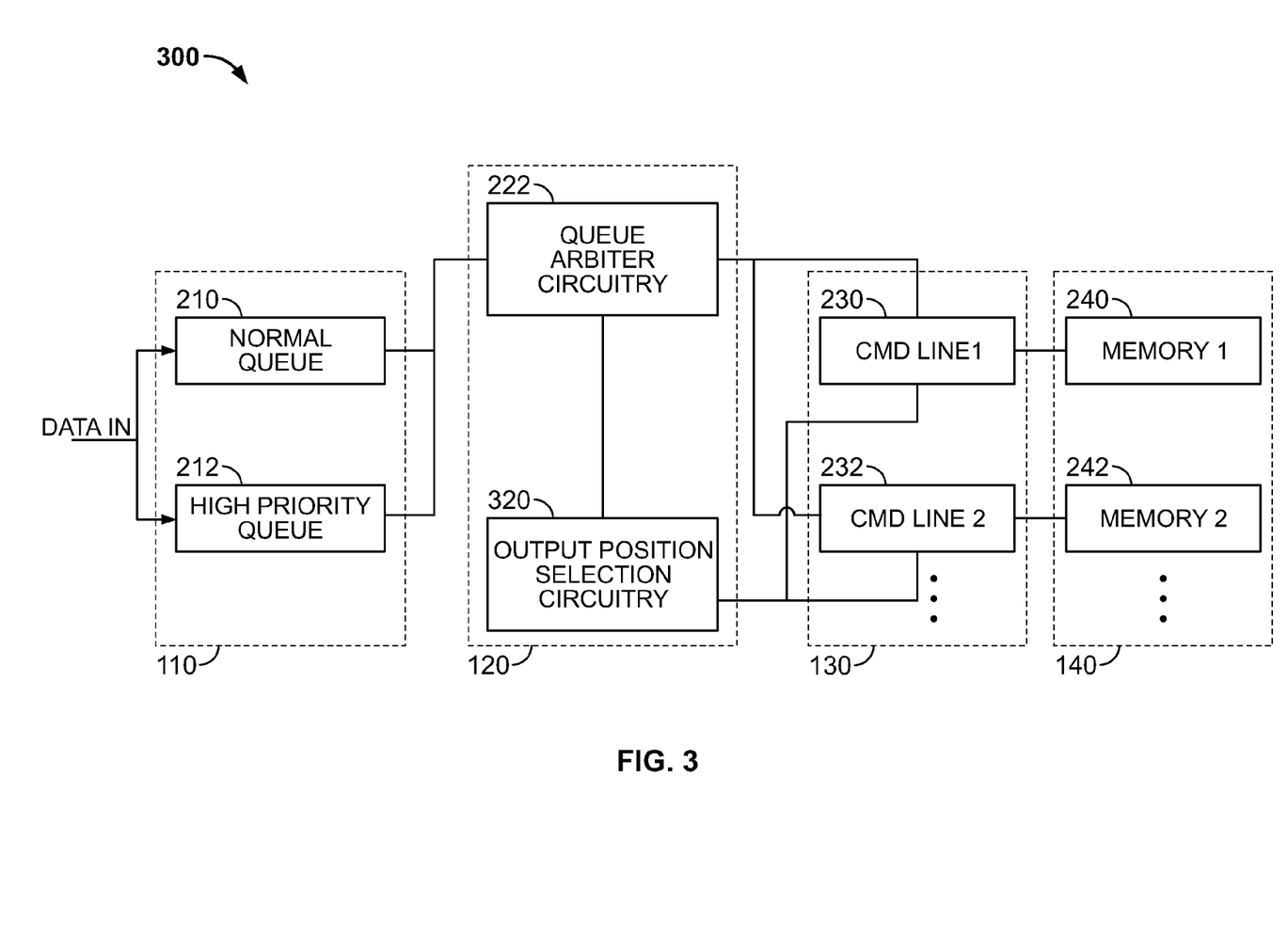
FIG. 3 is a diagram of an illustrative storage device commands management circuitry in accordance with an embodiment of the present disclosure.

FIG. 3 is a diagram of an illustrative storage device commands management circuitry 300 in accordance with an embodiment of the present disclosure. The components of circuitry 300 that correspond to the components of system 100 (FIG. 1) and circuit 200 (FIG. 2) are similarly labeled. In some embodiments, data 122 may be received from firmware by first buffer circuitry 110. First buffer circuitry 110 may process information in data 122 to determine whether the received command is associated with a high priority or normal priority.

In some embodiments, in response to determining that the received command is associated with a normal priority, first buffer circuitry 110 may select normal queue 210 in which to store the command. For example, first buffer circuitry 110 may select a position that is adjacent to and that follows the last stored command in normal queue 210 and may store the command in the selected position.

In some embodiments, in response to determining that the received command is associated with a high priority, first buffer circuitry 110 may select high priority queue 212 in which to store the command. For example, first buffer circuitry 110 may select a position that is adjacent to and that follows the last stored command in high priority queue 212 and may store the command in the selected position.

As discussed above in connection with circuitry 200, queue arbiter circuitry 222 may monitor second buffer circuitry 130 to determine whether space is available to transfer, move or assign commands from first buffer circuitry 110 to second buffer circuitry 130. In response to determining that second buffer circuitry 130 has space available, queue arbiter circuitry 222 may retrieve a command from first buffer circuitry 110. Commands may be retrieved from first buffer circuitry 110 in the same manner as discussed above in connection with FIGS. 1 and 2. In some implementations, queue arbiter circuitry 222 may determine whether the retrieved command is associated with a high priority. For example, commands that are retrieved from high priority queue 212 may be determined to be high priority commands, whereas commands that are retrieved from normal queue 210 may be determined to not be high priority.

In some embodiments, in response to determining that the retrieved commands is not associated with a high priority, queue arbiter circuitry 222 may transfer, move or assign the retrieved one or more commands to the back the end of second buffer circuitry 130. Specifically, queue arbiter circuitry 222 may store the retrieved commands directly to second buffer circuitry 130 without providing the command to output position selection circuitry 320. For example, queue arbiter circuitry 222 may transfer, move or assign the retrieved one or more commands to the back or the end of first command line 230 (e.g., the last position in the queue). In some embodiments, queue arbiter circuitry 222 may determine which of first command line 230 and second command line 232 has fewer commands and may select the one with the fewest number of commands in which to transfer, move or assign the retrieved one or more commands.

In some embodiments, in response to determining that the retrieved commands is associated with a high priority, queue arbiter circuitry 222 may provide the retrieved command to output position selection circuitry 320. Output position selection circuitry 320 may operate in a similar manner as input position selection circuitry 220 to bypass other commands stored in second buffer circuitry 130 when storing the retrieved commands. In particular, input position selection circuitry 220 may be used to bypass commands previously stored in first buffer circuitry 110, and output position selection circuitry 320 may be used to bypass commands previously stored in second buffer circuitry 130. Input position selection circuitry 220 and output position selection circuitry 320 may collectively or separately be referred to as "cut-in-line controller".

In some embodiments, queue arbiter circuitry 222 may determine which command line 230 or 232 has fewer commands stored and select the command line 230 or 232 with the fewest number of commands. Queue arbiter circuitry 222 may identify the selected command line to position selection circuitry 320 in addition to providing the retrieved commands. Position selection circuitry 320 may select a position that is ahead of any other command that is stored in the selected command line (e.g., second command line 232). In some implementations, in selecting the position, position selection circuitry 320 may determine whether bypassing other commands in the selected command line will conflict with the bypassed other commands. In particular, position selection circuitry 320 may cross-reference addresses of other commands stored in the selected command line to determine whether any of the addresses of other commands match the address of the received command. When none of the addresses of the other commands matches the address of the received command, position selection circuitry 320 may select the first position of the selected command line and store the received command in the first position ahead of all other commands stored in the selected command line. In doing so, position selection circuitry 320 may increment the position of all the other commands stored in the selected command line.

In some embodiments, in response to determining that an address of one of the other commands in the selected command line matches the address of the retrieved command, position selection circuitry 320 may determine whether the command in the selected command line with the matching address is a write command. In response to determining that the command is a write command, position selection circuitry 320 may select a position that is adjacent to and follows the command in the selected command line with the matching address. For example, the selected command line may include six commands (A-F) in respective positions 1-6. Position selection circuitry 320 may determine that command C, in position 3, has a matching address and is a write command as the retrieved command. Accordingly, position selection circuitry 320 may select position 4 in which to insert the retrieved command (i.e., the command received from queue arbiter circuitry 222). In doing so, the positions of commands D-F are incremented and, as such, commands D-F are moved to positions 5-7 from positions 4-6 to accommodate the retrieved command in position 5, which follows the conflicting command in position 4. Position selection circuitry 320 may process the remaining commands in the selected command line that are in positions that follow the selected position to determine that inserting the command in the selected position will not conflict with the other commands that are in later positions. If inserting the retrieved command in the selected position conflicts with other commands in later positions, position selection circuitry 320 may perform a similar process to position the retrieved command after any command that has an address that matches the retrieved command address.

In some embodiments, position selection circuitry 320 may process the commands stored in all of the command lines in second buffer circuitry 130 to determine whether a possibility exists to insert the retrieved commands in a different command line than that indicated by queue arbiter circuitry 222. For example, position selection circuitry 320 may first determine the earliest position in first command line 230 in which the retrieved command can be inserted without conflicting with previously stored commands in first command line 230. In particular, position selection circuitry 320 may determine that the retrieved commands can be inserted following position 3 in first command line 230. Position selection circuitry 320 may next determine the earliest position in second command line 232 in which the retrieved command can be inserted without conflicting with previously stored commands in second command line 232. In particular, position selection circuitry 320 may determine that the retrieved commands can be inserted following position 2 in second command line 232. Position selection circuitry 320 may compare the position available to insert the retrieved command in first command line 230 with the position available to insert the retrieved command in second command line 232. Position selection circuitry 320 may select the command line with the lowest position (e.g., the earliest position in the queue) as the command line in which to insert the retrieved command. For example, since position 2 is earlier than position 3, position selection circuitry 320 may select position 2 of second command line 232 in which to insert the retrieved commands.

Figure 4:
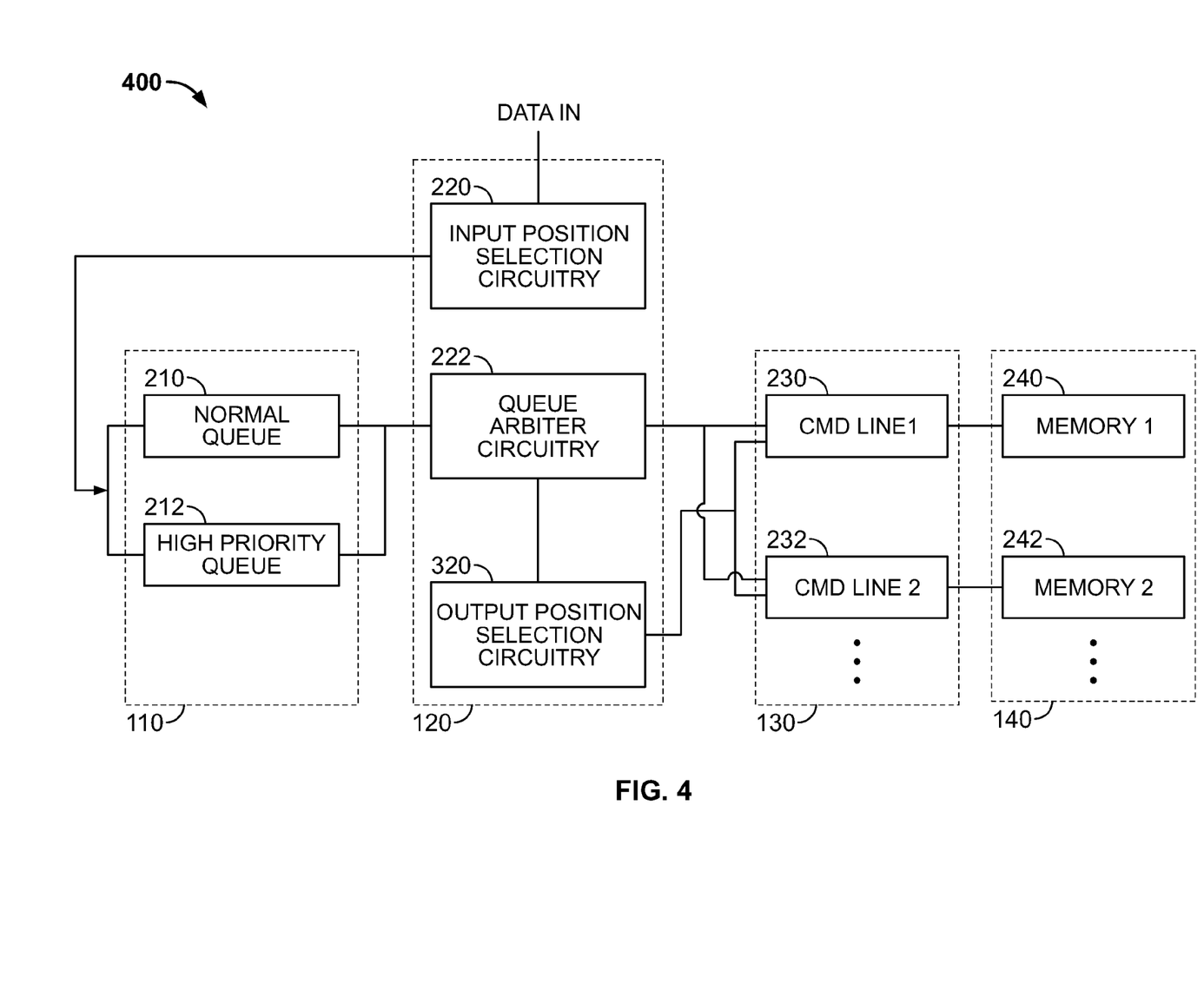
FIG. 4 is a diagram of an illustrative storage device commands management circuitry in accordance with an embodiment of the present disclosure.

FIG. 4 is a diagram of an illustrative storage device commands management circuitry 400 in accordance with an embodiment of the present disclosure. Circuitry 400 includes similar components as circuitries 100, 200 and 300. Specifically, circuitry 400 includes input position selection circuitry 220 and output position selection circuitry 320. Accordingly, in circuitry 400, input position selection circuitry 220 may process received data 122 and store the received data 122 to first buffer circuitry 110 in such a way that high priority commands bypass commands previously stored in first buffer circuitry 110. Similarly, in circuitry 400, output position selection circuitry 320 may process commands retrieved from first buffer circuitry 110 and store the retrieved commands to second buffer circuitry 130 in such a way that high priority commands bypass commands previously stored in second buffer circuitry 130. The process and techniques performed by input position selection circuitry 220 and output position selection circuitry 320 may be the same as those discussed in relation to circuitries 200 and 300, respectively.

Figure 5:
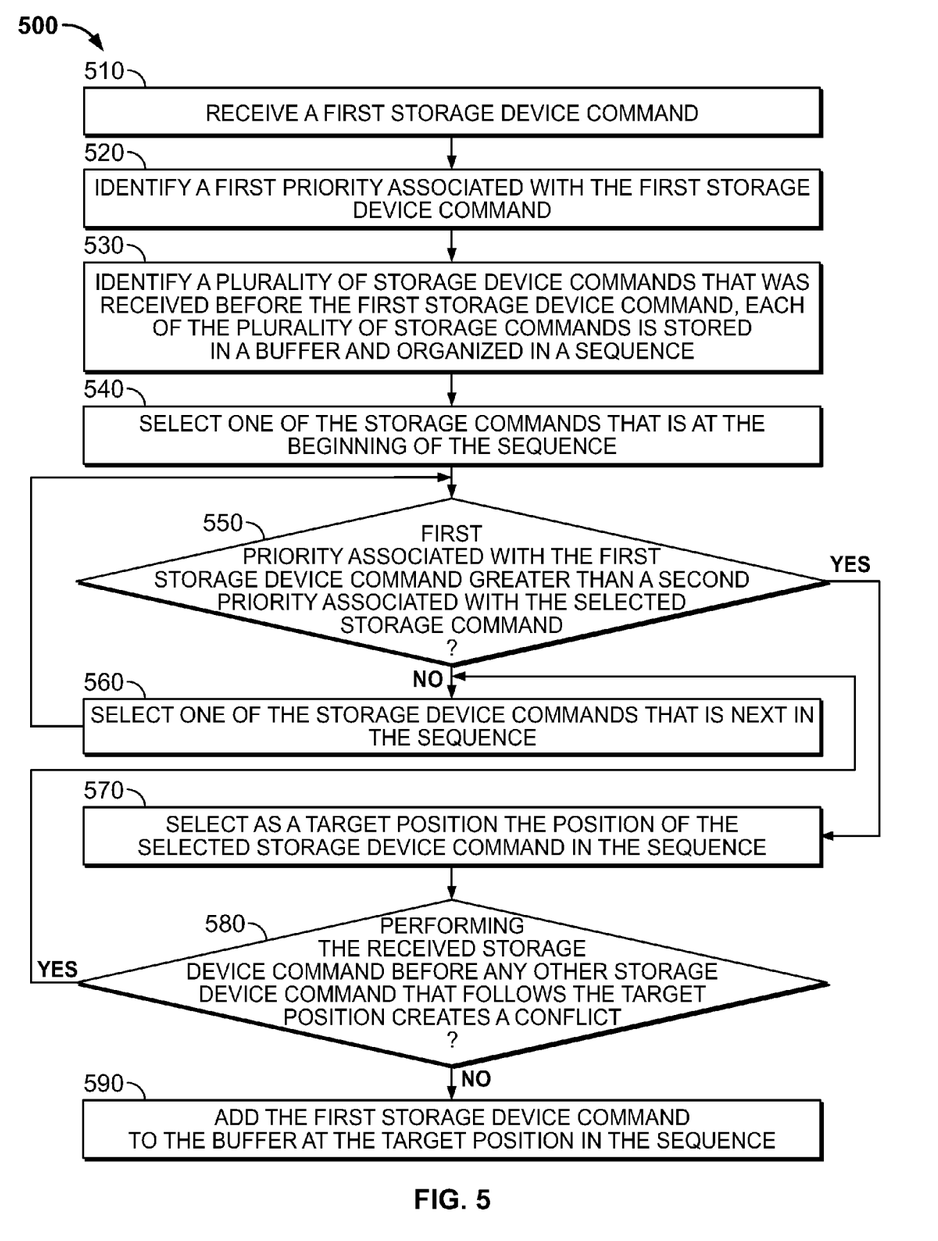
FIG. 5 is an illustrate process for managing storage device commands in accordance with an embodiment of the present disclosure.

FIG. 5 is an illustrate process 500 for managing storage device commands in accordance with an embodiment of the present disclosure. At 510, a first storage device command is received. For example, control circuitry 120 and/or first buffer circuitry 110 may receive data 122 (FIG. 1). Data 122 may include a storage device command (e.g., user data, address information, read/write request, and/or priority information).

At 520, a first priority associated with the first storage device command is identified. For example, control circuitry 120 and/or first buffer circuitry 110 may process the information included in data 122 to determine whether the command is a high priority command or normal priority command.

At 530, a plurality of storage device commands that was received before the first storage device command is identified, each of the plurality of storage commands is stored in a buffer and organized in a sequence. For example, control circuitry 120 may identify other commands stored in first buffer circuitry 110 and/or second buffer circuitry 130 (FIG. 1). The commands stored in first buffer circuitry 110 and/or second buffer circuitry 130 may have been stored before data 122 was received. In some implementations, first buffer circuitry 110 and/or second buffer circuitry 130 may be implemented as a queue (where data is output in the order in which it was received—first in, first out sequence) and/or a stack (where data is output in a last in, first out sequence).

At 540, one of the storage device commands that is at the beginning of the sequence is selected. For example, control circuitry 120 may select the storage device commands that is next to be output in the sequence from first buffer circuitry 110 and/or second buffer circuitry 130.

At 550, a determination is made as to whether the first priority associated with the first storage device command is greater than a second priority associated with the selected storage device command. In response to determining that the first priority is greater than the second priority, the process proceeds to 560; otherwise the process proceeds to 570. For example, control circuitry 120 may retrieve a priority from the selected storage device command and compare the retrieved priority to the first priority associated with the received storage device command. In some implementations, control circuitry 120 may determine whether the received command is associated with a high priority and the selected command is associated with a normal priority. In some implementations, control circuitry 120 may determine that the received command is associated with a high priority if the received command is stored in high priority queue 212 (FIG. 2). In some implementations, before proceeding to step 570, control circuitry 120 may determine whether any other storage device command stored in first buffer circuitry 110 and/or second buffer circuitry 130 is associated with a priority that is greater than the first priority associated with the received storage device command. If there are no other storage device commands with a higher priority, then the process proceeds to step 570. If there is a storage device command with a higher priority, control circuitry 120 may select as a target position the position that follows the command with the higher priority and proceed to step 580.

At 560, one of the storage device commands that is next in the sequence is selected. In particular, if there are still storage commands that have not been selected, then the next in sequence storage command is selected to compare its priority with the priority of the received storage device command. For example, control circuitry 120 may advance to the next position in the sequence and select the command stored at the next position in first buffer circuitry 110 and/or second buffer circuitry 130. If there are no more storage device commands stored in first buffer circuitry 110 and/or second buffer circuitry 130 to select, then the process proceeds to step 570. In some implementations, the commands are organized in sequence in first buffer circuitry 110 and/or second buffer circuitry 130 according to priority. Specifically, the command with the highest priority that will not create a conflict if processed before all other storage device commands stored in first buffer circuitry 110 and/or second buffer circuitry 130 is positioned ahead of all other storage device commands that are stored.

At 570, the position of the selected storage device command in the sequence is selected as a target position. For example, control circuitry 120 may select the position of the selected storage device command as the position in the sequence of first buffer circuitry 110 and/or second buffer circuitry 130 in which to insert the received storage device command.

At 580, a determination is made as to whether performing the received storage device command before any other storage device command that follows the target position creates a conflict. In response to determining that performing the received storage device command before any other storage device command that follows the target position creates a conflict, the process proceeds to 560; otherwise the process proceeds to 590. For example, control circuitry 120 may identify addresses of each command stored in a sequence position in first buffer circuitry 110 and/or second buffer circuitry 130 after the target position. Control circuitry 120 may determine whether any of the identified address match the address of the received command. If the addresses match, control circuitry 120 may determine the operation (read or write) associated with the stored commands and the operation (read or write) associated with the received command.

In some embodiments, if the operation associated with the stored command is a read operation and the received command operation is a read operation, control circuitry 120 may determine that no conflict exists between the two commands. If the operation associated with the stored command is a write operation and the received command operation is a read operation, control circuitry 120 may determine that a conflict exists between the two commands. If the operation associated with the stored command is a read operation and the received command operation is a write operation, control circuitry 120 may determine that a conflict exists between the two commands. If the operation associated with the stored command is a write operation and the received command operation is a write operation, control circuitry 120 may determine that a conflict exists between the two commands.

At 590, the first storage device command is added to the buffer at the target position in the sequence. For example, control circuitry 120 may add the received command at a position in the sequence of first buffer circuitry 110 and/or second buffer circuitry 130 corresponding to the target position. Control circuitry 120 may increment the position in the sequence of other commands stored in first buffer circuitry 110 and/or second buffer circuitry 130 that follow the target position and may move the current command that is in the target position to the next position (e.g., may increment the position of the command currently stored at the target position).

For example, first buffer circuitry 110 may include storage device commands arranged in the following sequence: [HIGH PRIORITY COMMAND 1; NORMAL PRIORITY COMMAND 2; NORMAL PRIORITY COMMAND 3; NORMAL PRIORITY COMMAND 4]. Control circuitry 120 may receive a new command as HIGH PRIORITY COMMAND 5. In response, control circuitry 120 may select the first position in first buffer circuitry 110 (e.g., HIGH PRIORITY COMMAND 1). Control circuitry 120 may determine whether the priority associated with the received command is higher than the priority of the selected command. In this case, the priority of the received command is not higher and accordingly control circuitry 120 may select the second position (e.g., NORMAL PRIORITY COMMAND 2). Control circuitry 120 may determine whether the priority associated with the received command is higher than the priority of the selected command. Because the priority of the received command (e.g., HIGH) is higher than that of the selected command (e.g., NORMAL), control circuitry 120 may select as the target position, the position of the selected command.

Control circuitry 120 may determine whether performing the received command (e.g., HIGH PRIORITY COMMAND 5) before all other commands that follow the selected position will create a conflict. If not, control circuitry 120 may insert the received command at the target position causing the commands to be rearranged in the following sequence: [HIGH PRIORITY COMMAND 1; HIGH PRIORITY COMMAND 5; NORMAL PRIORITY COMMAND 2; NORMAL PRIORITY COMMAND 3; NORMAL PRIORITY COMMAND 4]. If control circuitry 120 determines that performing the received command (e.g., HIGH PRIORITY COMMAND 5) before another command (e.g., NORMAL PRIORITY COMMAND 2) that follows the selected position will create a conflict, control circuitry 120 may select as the target position the position that follows the another command. Control circuitry 120 may insert the received command at the target position causing the commands to be rearranged in the following sequence: [HIGH PRIORITY COMMAND 1; NORMAL PRIORITY COMMAND 2; HIGH PRIORITY COMMAND 5; NORMAL PRIORITY COMMAND 3; NORMAL PRIORITY COMMAND 4].

The foregoing describes methods and an apparatus for storing information in a solid state storage device. The above-described embodiments of the present disclosure are presented for the purposes of illustration and not of limitation. Furthermore, the present disclosure is not limited to a particular implementation. For example, one or more steps of methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software.

What is claimed is:

1. A method for managing storage device commands, the method comprising:
   receiving a first storage device command;
   identifying a first priority associated with the first storage device command;
   identifying a plurality of storage device commands that were received before the first storage device command, wherein each of the plurality of storage device commands is stored in a buffer and organized in a sequence;
   determining whether the first priority associated with the first storage device command is greater than a second priority associated with a second storage device command of the plurality of storage device commands;
   adding the first storage device command to the buffer at a first position in the sequence that is earlier than a second position of the second storage device command in response to determining the first priority is greater than the second priority;

determining whether a third of the plurality of storage device commands at a beginning of the sequence in the buffer is associated with a priority that is greater than a threshold;

in response to determining the third storage device command is associated with a priority that is greater than the threshold, adding the third storage device command to a command line buffer at a target position based on the priority of the third storage device command relative to other commands in the command line buffer; and in response to determining the third storage device command is associated with a priority that is not greater than the threshold, adding the third storage device command to the command line buffer at a next available position in the command line buffer.

2. The method of claim 1, wherein the priority of each storage device command is received from a host device external to the storage device.

3. The method of claim 1 further comprising retrieving the storage device commands from the buffer according to the sequence to operate on a storage device.

4. The method of claim 1, wherein the buffer includes a queue that has a head and a tail, and wherein the first position in the sequence is closer to the head of the queue than the tail of the queue.

5. The method of claim 1 further comprising before adding the first storage device command to the buffer, determining whether adding the first storage device command at the first position in the sequence conflicts with a third of the storage device commands in the buffer that is in a third position that is later than the first position in the sequence.

6. The method of claim 5 further comprising adding the first storage device command to the buffer at a fourth position that is later than the third position in the sequence in response to determining that adding the first storage device command at the first position conflicts with the third storage device command.

7. The method of claim 5 further comprising performing the adding the first storage device command to the buffer at the first position in response to determining that adding the first storage device command at the first position does not conflict with the third storage device command.

8. The method of claim 1, wherein the buffer is a first buffer, further comprising:

determining whether the first priority associated with the first storage device command is greater than a priority associated with any of the storage device commands in the first buffer; and in response to determining that the first priority is not greater than the priority associated with any of the storage device commands in the first buffer, determining whether the first priority associated with the first storage device command is greater than a third priority associated with a third storage device command in a second buffer.

9. The method of claim 8 further comprising adding the first storage device command to the second buffer at a first position in the sequence that is earlier than a third position of the third storage device command in response to determining the first priority is greater than the third priority instead of adding the first storage device command to the first buffer.

10. The method of claim 1 further comprising moving storage device commands stored in the buffer to one of a plurality of command line buffers in an order determined by the sequence, each of the command line buffers outputs to a corresponding one of a plurality of storage devices.

11. A system for managing storage device commands, the system comprising:

a buffer; and control circuitry configured to:

receive a first storage device command;

identify a first priority associated with the first storage device command;

identify a plurality of storage device commands that was received before the first storage device command, wherein each of the plurality of storage device commands is stored in the buffer and organized in a sequence;

determine whether the first priority associated with the first storage device command is greater than a second priority associated with a second storage device command of the plurality of storage device commands;

add the first storage device command to the buffer at a first position in the sequence that is earlier than a second position of the second storage device command in response to determining the first priority is greater than the second priority;

determine whether a third of the plurality of storage device commands at a beginning of the sequence in the buffer is associated with a priority that is greater than a threshold;

in response to determining the third storage device command is associated with a priority that is greater than the threshold, add the third storage device command to a command line buffer at a target position based on the priority of the third storage device command relative to other commands in the command line buffer; and in response to determining the third storage device command is associated with a priority that is not greater than the threshold, add the third storage device command to the command line buffer at a next available position in the command line buffer.

12. The system of claim 11, wherein the priority of each storage device command is received from a host device external to the storage device.

13. The system of claim 11, wherein the control circuitry is further configured to retrieve the storage device commands from the buffer according to the sequence to operate on a storage device.

14. The system of claim 11, wherein the buffer includes a queue that has a head and a tail, and wherein the first position in the sequence is closer to the head of the queue than the tail of the queue.

15. The system of claim 11, wherein the control circuitry is further configured to, before adding the first storage device command to the buffer, determine whether adding the first storage device command at the first position in the sequence conflicts with a third of the storage device commands in the buffer that is in a third position that is later than the first position in the sequence.

16. The system of claim 15, wherein the control circuitry is further configured to add the first storage device command to the buffer at a fourth position that is later than the third position in the sequence in response to determining that adding the first storage device command at the first position conflicts with the third storage device command.

17. The system of claim 15, wherein the control circuitry is further configured to perform the adding the first storage device command to the buffer at the first position in response to determining that adding the first storage device command at the first position does not conflict with the third storage device command.

18. The system of claim 11, wherein the buffer is a first buffer, wherein the control circuitry is further configured to:
- determine whether the first priority associated with the first storage device command is greater than a priority associated with any of the storage device commands in the first buffer; and
- in response to determining that the first priority is not greater than the priority associated with any of the storage device commands in the first buffer, determine whether the first priority associated with the first storage device command is greater than a third priority associated with a third storage device command in a second buffer.

19. The system of claim 18, wherein the control circuitry is further configured to add the first storage device command to the second buffer at a first position in the sequence that is earlier than a third position of the third storage device command in response to determining the first priority is greater than the third priority instead of adding the first storage device command to the first buffer.

20. The system of claim 11, wherein the control circuitry is further configured to move storage device commands stored in the buffer to one of a plurality of command line buffers in an order determined by the sequence, each of the command line buffers outputs to a corresponding one of a plurality of storage devices.

* * * * *